United States Patent
Truelove et al.

(10) Patent No.: US 11,210,233 B2
(45) Date of Patent: Dec. 28, 2021

(54) SYSTEM AND METHOD FOR HANDLING ADDRESS TRANSLATION INVALIDATIONS USING AN ADDRESS TRANSLATION INVALIDATION PROBE

(71) Applicant: International Business Machines Corporation, Armonk, NY (US)

(72) Inventors: Jake Truelove, Austin, TX (US); David Campbell, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 20 days.

(21) Appl. No.: 16/736,531

(22) Filed: Jan. 7, 2020

(65) Prior Publication Data
US 2021/0209031 A1 Jul. 8, 2021

(51) Int. Cl.
 *G06F 12/1027* (2016.01)

(52) U.S. Cl.
 CPC .. *G06F 12/1027* (2013.01); *G06F 2212/1024* (2013.01); *G06F 2212/50* (2013.01); *G06F 2212/683* (2013.01)

(58) Field of Classification Search
 CPC .......... G06F 2212/683; G06F 12/0833; G06F 12/0808
 See application file for complete search history.

(56) References Cited

U.S. PATENT DOCUMENTS

| | | | |
|---|---|---|---|
| 9,684,606 B2 | 6/2017 | Kessler et al. | |
| 9,697,137 B2 | 7/2017 | Mukherjee | |
| 9,710,394 B2 | 7/2017 | Guthrie et al. | |
| 2008/0222396 A1* | 9/2008 | Spracklen | G06F 21/71 712/220 |
| 2017/0286314 A1 | 10/2017 | Shacham et al. | |
| 2018/0165197 A1* | 6/2018 | Mukherjee | G06F 12/0808 |
| 2019/0332550 A1* | 10/2019 | Norman | G06F 12/1027 |
| 2020/0097413 A1* | 3/2020 | Raval | G06F 12/1045 |
| 2020/0167292 A1* | 5/2020 | Horsnell | G06F 12/0873 |

\* cited by examiner

*Primary Examiner* — Chie Yew
(74) *Attorney, Agent, or Firm* — Scully, Scott, Murphy & Presser, P.C.

(57) ABSTRACT

A method and system of managing addresses translations where in response to a request to invalidate an address translation, the scope of the address translation invalidation operation is determined; an address translation invalidation probe is installed or activated in a memory management unit (MMU) pipeline; whether an address translation undergoing a table walk operation is within a scope of the address translation invalidation probe is determined; and in response to the address translation undergoing a table walk operation being within the scope of the address translation invalidation probe, preventing or blocking the table walk operation from writing data to a translation buffer in the MMU. The probe also performs an address translation comparison to determine whether an address translation request coming down the MMU pipeline is within the scope of the probe, and if within the scope of the probe, prevents, blocks and/or rejects the address translation.

19 Claims, 6 Drawing Sheets

SYSTEM AND METHOD FOR HANDLING ADDRESS TRANSLATION INVALIDATIONS USING AN ADDRESS TRANSLATION INVALIDATION PROBE

BACKGROUND

The disclosure herein relates generally to information handling and/or data processing systems, and more particularly, to methods, apparatus, and systems for optimizing address translation invalidations in an information handling system, e.g., a computer system.

Among other tasks, memory management manages the data stored in a computer including overseeing the retrieval and storage of data from memory in a computer. Memory management is often a key factor in overall system performance for a computer. Computer systems often include physical memory used to store applications and data. Modern computers typically rely on a memory management technique known as virtual memory management to increase performance and provide greater flexibility in computers and the underlying architectural designs upon which they are premised.

Virtual memory management systems can include a hypervisor or virtual machine monitor (VVM), which is computer software, firmware, or hardware that creates and runs multiple virtual machines as guests on a computer system where computing resources such as memory and processing capability are shared. With a virtual memory system, the underlying hardware implementing the memory system of a computer is effectively hidden from the software of the computer. Computer programs that execute on the computer access the memory system using addresses pointing to locations in the virtual memory space. The physical memory devices in the computer, however, are accessed via "real" addresses that map directly into specific memory locations in the physical memory devices. Hardware and/or software in the computer are provided to perform "address translation" to map virtualized addresses in the virtual memory space to the real memory addresses of the physical memory. As such, whenever a computer program on a computer attempts to access memory using a virtualized address, the computer translates the virtualized address into a corresponding real address so that access can be made to the appropriate location in the appropriate physical device.

Often, due to the large number of memory accesses that constantly occur in a computer, the number of entries required to map all of the memory address space in use by a computer can be significant, and requires the numerous entries mapping the address translations to be stored in main storage as page tables or segment tables, rather than in dedicated memory, which makes accessing such entries slow. To accelerate address translation, modern processors typically contain high speed memories (e.g., look-up tables stored in cache) referred to as segment look-aside buffers (SLB) and translation look-aside buffers (TLB) that are used to cache recently-used entries for quick access by the computer. A SLB is a cache of segment table entries (STEs) and can include numerous entries. Each segment typically is mapped to multiple pages or page table entries (PTEs). A TLB is a cache of page table entries (PTEs) and can include numerous entries. With each memory access, the address to be translated is presented to the SLB and/or to the TLB, and if the SLB and/or TLB has a match (hits), an address, e.g., real address (RA), is provided to the processor. If the address misses in the SLB and/or TLB, then the segment table and page table should be checked for the address translation, and in embodiments a more costly hardware handler or software handler is invoked to load and insert the required segment table entry (STE) into the SLB, and/or the page table entry (PTE) into the TLB so the address will hit in the SLB and TLB and the memory access can proceed.

The SLB and/or TLB data structures residing in dedicated memory for the processor, and the page table and/or segment table residing in main memory all participate in virtual memory address translation and all these tables and data structures must be properly managed. For example, when a hypervisor takes down a process on a given system, any remnants of old translations to the old process memory can no longer be accessible by any other software program running on the system. To prevent old data from being accessed by software programs running on the system, e.g. a virtual user, an invalidation operation is performed to remove any old translations related to the process that was just removed. Because of the size of the translation data structures, this translation invalidation process can take a long time and can affect system performance. As such, it is desirable to minimize the amount of time the system is tied up invalidating old translations.

SUMMARY

The summary of the disclosure is given to aid understanding of a computer system, computer architectural structure, processor, memory system, and method of translating addresses and invalidating address translations in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, memory system, and their method of operation to achieve different effects.

A method of managing addresses translations by a processing system is disclosed. The method in one or more embodiments includes: in response to a request to invalidate one or more address translations, determining the scope of an address translation invalidation operation; installing an address translation invalidation probe in a memory management unit (MMU) pipeline; determining whether the address translation undergoing a table walk operation is within a scope of the address translation invalidation probe; and in response to the address translation undergoing the table walk operation being within the scope of the address translation invalidation probe, preventing the table walk operation from writing data to a lookaside buffer. The method further includes processing the address translation invalidation operation while the processing system determines whether the address translation undergoing the table walk operation is within the scope of the address translation invalidation probe. The scope of the address translation invalidation probe in one or more aspects is same scope as, is commensurate in scope with, or is broader in scope than, the address translation invalidation operation. The method in an embodiment further includes, in response to an address translation undergoing a table walk operation within the scope of the address translation invalidation probe, preventing the table walk operation from continuing the table walk procedure. The method further includes determining whether the address translation invalidation operation is complete; and in response to the address translation invalidation operation being complete, deactivating the address translation invalidation probe.

The method further including the address translation invalidation probe performing an address translation comparison to determine whether an address translation request coming down the MMU pipeline is within the scope of the address translation invalidation probe. The method further including performing a comparison by the address translation invalidation probe on an address translation returned by the lookaside buffer, and if the address translation returned by the lookaside buffer is within the scope of the address translation invalidation probe, overriding or blocking the address translation returned by the lookaside buffer. The method in an aspect further including, in response to the address translation returned by the lookaside buffer not being within the scope of the address translation invalidation probe, allowing an address translation process to proceed, including proceeding outside the MMU.

A method of managing addresses translations by a processing system is disclosed, where the method in one or more embodiments includes: in response to a request to invalidate one or more address translations, determining the scope of the address translation invalidation operation; using the scope of the address translation invalidation operation to determine the scope of an address translation invalidation probe; installing the address translation invalidation probe in a memory management unit (MMU) pipeline; performing an address translation comparison to determine whether an address translation request returned by a lookaside buffer in the MMU pipeline is within the scope of the address translation invalidation probe; and in response to the address translation returned by the lookaside buffer being within the scope of the address translation invalidation probe, preventing or blocking the address translation results returned by the lookaside buffer from being used. The method in an embodiment, includes, in response to the address translation results returned by the lookaside buffer not being within the scope of the address translation invalidation probe, allowing a translation process to proceed, including proceeding outside the MMU. The method in one or more aspects includes: determining whether the address translation undergoing a table walk operation is within a scope of the address translation invalidation probe; and in response to the address translation undergoing the table walk operation being within the scope of the address translation invalidation probe, preventing or blocking the table walk operation from writing data to the lookaside buffers. The scope of the address translation invalidation probe in an aspect is the same scope as, is commensurate in scope to, or is broader in scope than, the address translation invalidation operation. The method in an embodiment further includes processing the address translation invalidation operation while the processing system determines whether the address translation undergoing the table walk operation is within the scope of the address translation invalidation probe. The method further including in one or more aspects includes invalidating the address translations in lower level caches outside the MMU wherein the invalidation operation is not complete until the address translations in the lower caches are scrubbed.

In one or more embodiments a computing system is disclosed that includes a processor having a memory management unit (MMU) for managing address translations; an address translation lookaside buffer having a plurality of entries; and a non-transitory computer-readable storage medium comprising program instructions that when executed by the processor cause the system to: in response to a request to invalidate one or more address translations, determine the scope of the address translation invalidation operation; use the scope of the address translation invalidation operation to determine the scope of an address translation invalidation probe; install the address translation invalidation probe in a memory management unit (MMU) pipeline having a scope of invalidation the same as, commensurate with, or broader than, the scope of the address translation invalidation operation; perform an address translation comparison to determine whether an address translation request coming down the MMU pipeline is within the scope of the invalidation probe; in response to the address translation returned by the lookaside buffer being within the scope of the address translation invalidation probe, do not use the address translation returned by the lookaside buffer; and in response to the address translation returned by the lookaside buffer not being within the scope of the address translation invalidation probe, allow a translation process to proceed to obtain the address translation including proceeding outside the MMU. The system in an embodiment further including program instructions that when executed by the processor cause the processor to: determine whether the address translation undergoing a table walk operation is within a scope of the invalidation probe; and in response to the address translation undergoing the table walk operation being within the scope of the address translation invalidation probe, prevent the table walk operation from continuing and/or writing data to the lookaside buffers. The system in an embodiment also including program instructions that when executed by the processor cause the processor to: determine whether the invalidation operation is complete; and in response to the invalidation operation being complete, deactivate the address translation invalidation probe.

The foregoing and other objects, features and advantages of the invention will be apparent from the following more particular descriptions of exemplary embodiments of the invention as illustrated in the accompanying drawings wherein like reference numbers generally represent like parts of illustrative embodiments of the invention.

BRIEF DESCRIPTION OF THE DRAWINGS

The various aspects, features and embodiments of a computer system, computer architectural structure, processor, memory system, and their method of operation will be better understood when read in conjunction with the figures provided. Embodiments are provided in the figures for the purpose of illustrating aspects, features, and/or various embodiments of the computer system, computer architectural structure, processors, memory systems, and their method of operation, but the claims should not be limited to the precise arrangement, structures, features, aspects, systems, assemblies, subassemblies, systems, circuitry, embodiments, methods, processes, techniques, and/or devices shown, and the arrangements, structures, systems, assemblies, subassemblies, features, aspects, methods, processes, techniques, circuitry, embodiments, and devices shown may be used singularly or in combination with other arrangements, structures, assemblies, subassemblies, systems, features, aspects, circuitry, embodiments, methods, techniques, processes, and/or devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, memory system, and their method of operation, however, it will be understood by those skilled in the art that different and numerous embodiments of the computer system, computer architectural structure, processor, memory system, and their method of operation may be practiced without those specific details, and the claims and disclosure should not be limited to the arrangements, structures, systems, assemblies, subassemblies, circuitry, features, aspects, processes, methods, techniques, embodiments, and/or details specifically described and shown herein. Further, particular features, aspects, arrangements, systems, embodiments, techniques, etc. described herein can be used in combination with other described features, aspects, arrangements, systems, embodiments, techniques, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, steps, operations, elements, and/or components, but do not preclude the presence or addition of one or more other features, integers, aspects, arrangements, embodiments, structures, systems, assemblies, subassemblies, steps, operations, elements, components, and/or groups thereof.

The following discussion omits or only briefly describes conventional features of information processing systems, including processors, microprocessor systems, memory systems, and their architectures, as well as address translation invalidation techniques and systems, which should be apparent to those skilled in the art. It is assumed that those skilled in the art are familiar with the general architecture of processors, memory systems, and in particular with address translation techniques and systems, their operation and address translation invalidation techniques. It may be noted that a numbered element is numbered according to the figure in which the element is introduced, and is typically referred to by that number throughout succeeding figures.

Modern computers typically rely on a memory management technique known as virtual memory management to increase performance and provide greater flexibility in computers and the underlying architectural designs upon which they are premised. Virtual memory management systems can include a hypervisor or virtual machine monitor (VVM), which creates and runs multiple virtual machines as guests on a computer system where computing resources such as memory and processing capability are shared. Computer programs that execute on the computer access the memory system using addresses pointing to locations in the virtual memory space. The physical memory devices in the computer, however, are accessed via "real" addresses that map directly into specific memory locations in the physical memory devices. Hardware and/or software in the computer are provided to perform "address translation" to map virtualized addresses in the virtual memory space to the real memory addresses of the physical memory. As such, whenever a computer program on a computer attempts to access memory using a virtualized address, the computer translates the virtualized address into a corresponding real address so that access can be made to the appropriate location in the appropriate physical device.

When running virtualization on processors, a fully virtualized address translation architecture can have two scopes of translation. The first scope of address translation, referred to as process-scoped translation, is where a virtualized address utilized by a virtual machine or guest machine running on a hypervisor needs translating to a virtualized address recognized and used by the hypervisor. The addresses that require a process-scoped translation have a Process Identifier (PID). The second scope of translation, referred to as a partition-scoped translation, is for the hypervisor where the virtualized address is translated into a real address, e.g., a specific location in physical memory. The addresses that require a partition-scoped translation have a Logical Partition Identifier (LPID). Both of these address translations will operate independently from software's point of view, but hardware must traverse both translations in such a nested address to convert a virtualized address running on a virtual machine to a real address.

One feature of virtual addressing is that it not necessary for a computer to include storage for the entire virtual memory space in the physical memory devices in the computer's main memory, e.g., RAM. Instead, lower levels of storage, such as disk drives and other mass storage devices may be used as supplemental storage, with memory addresses grouped into "pages" that are swapped between the main memory and supplemental storage as needed ("paging"). Address translation in a virtual memory system typically incorporates accessing various address translation data structures. Some computer designs include the concept of segmentation, which partitions the virtual memory into different segments in order to facilitate and simplify the handling of large and growing data structures. One address translation data structure, referred to as a segment table, includes multiple entries that map each segment to blocks of multiple pages. Another address translation data structure, referred to as a page table, includes multiple entries that map virtual addresses to real addresses on a page-by-page basis. Using virtual addressing, processors can access memory using physical addresses (RAs) that are generated from translating virtualized addresses. When segmentation is used, an additional layer of virtualization is used, requiring an additional translation to be performed.

Modern (micro) processors typically contain translation look-up tables to help increase the speed at which systems can execute address translations. These translation look-up tables, often referred to as translation lookaside buffers (TLBs) and segment lookaside buffers (SLBs), often reside in dedicated memory in the processor and allow the system to do quick look-ups of a given virtualized address to find its corresponding address without having to perform the time intensive process of obtaining the translation through a table walk process. When the requested address for translation is not in the look-up tables residing in dedicated memory in the processor, modern processors typically utilize page tables and/or segment tables in main memory and will perform a table walk translation process. These data structures used for address translation, e.g., look-up tables (lookaside buffers) in the processor, and page and/or segment tables in main memory, or other data structures used for address translation, must be properly managed. For example, when a hypervisor takes down a process on a given system, e.g., removes the processes allocated to memory, the hypervisor must insure that any remnants of the old translations to the memory are no longer accessible by any software running on the system.

When an address translation is no longer valid, the system typically undergoes an invalidation process to make those memory locations inaccessible by removing any old translations in the lookaside buffers that relate to the process that was removed. In an embodiment, to invalidate address translations that are no longer valid, an invalidate entry instruction (SLBie, TLBie) is broadcast throughout the system, address translation data structures (e.g., TLB, SLB, IUSBs) are located, and each entry in the address translation data structure (e.g., TLB cache, SLB cache) is searched to determine if it has an entry that matches the address to be invalidated. If an invalidation operation is a broad-based invalidation operation such as, for example, a partition-scoped invalidate or a process-scoped invalidate, the MMU must walk the entire lookaside buffer and clear any translation that hits on the logical partition ID (LPID) or process ID (PID) that is being invalidated. In modern processors with lookaside tables on the order of thousands of entries, the invalidation process can take many thousands of cycles as every entry must be checked to see if it matches on the invalidation criteria.

In addition to the long latency associated with a translation invalidation process snooping (looking through) the lookaside tables, the memory management unit (MMU), the unit that manages the lookaside tables, should prevent, while the invalidation operation is being performed, any other thread from populating the lookaside tables with translations that should be invalidated by the invalidation operation. Under traditional techniques for insuring that new address translations that should have been invalidated are not added to the lookaside tables, the address invalidation process causes the processor to operate in a single thread mode. That is, in multi-threaded processors, when an invalidation operation (request) is sent to the memory management unit (MMU), the MMU changes to a single thread mode, and all operations being performed on the other threads are stopped. Work on the other threads is stopped to prevent another thread from adding a translation to the lookaside tables that would otherwise be removed by the invalidation operation. In addition, moving to a single thread window also prevents the movement of existing translations in lookaside tables across varying caches and lookaside tables. The invalidation process may need to invalidate multiple different caching structures (lookaside tables, caches, erats, etc) and each of these caching structures can take different amounts of time to invalidate the caching structure. This means that an ERAT could finish invalidating before a lookaside buffer. It would be problematic if an instruction on a different thread was allowed to move a translation from the lookaside buffer to the ERAT after the ERAT was invalidated, but before the lookaside buffer was finished being invalidated. If the MMU does not execute the invalidation operation in a single thread window, there is the possibility that remnants of what was intended to be invalidated will still be left in the lookaside tables when the invalidation operation is completed.

Thus invalidation operations can be a huge drain on performance, as they halt work from being performed on all other threads slowing down operations and incurring latency penalties, and they incur long latency to complete as all the entries in the address translation look-up tables need to be checked. In some cases, where too many invalidation operations are issued in close proximity to each other, the entire system can hang due to no forward progress being allowed on any of the threads. Invalidating address translations can have a significant impact on overall system performance. As such it is desirable to minimize the amount of time to invalidate address translations, and to permit the processor to continue to execute instructions in multi-threaded fashion during such invalidation operations.

Figure 1:
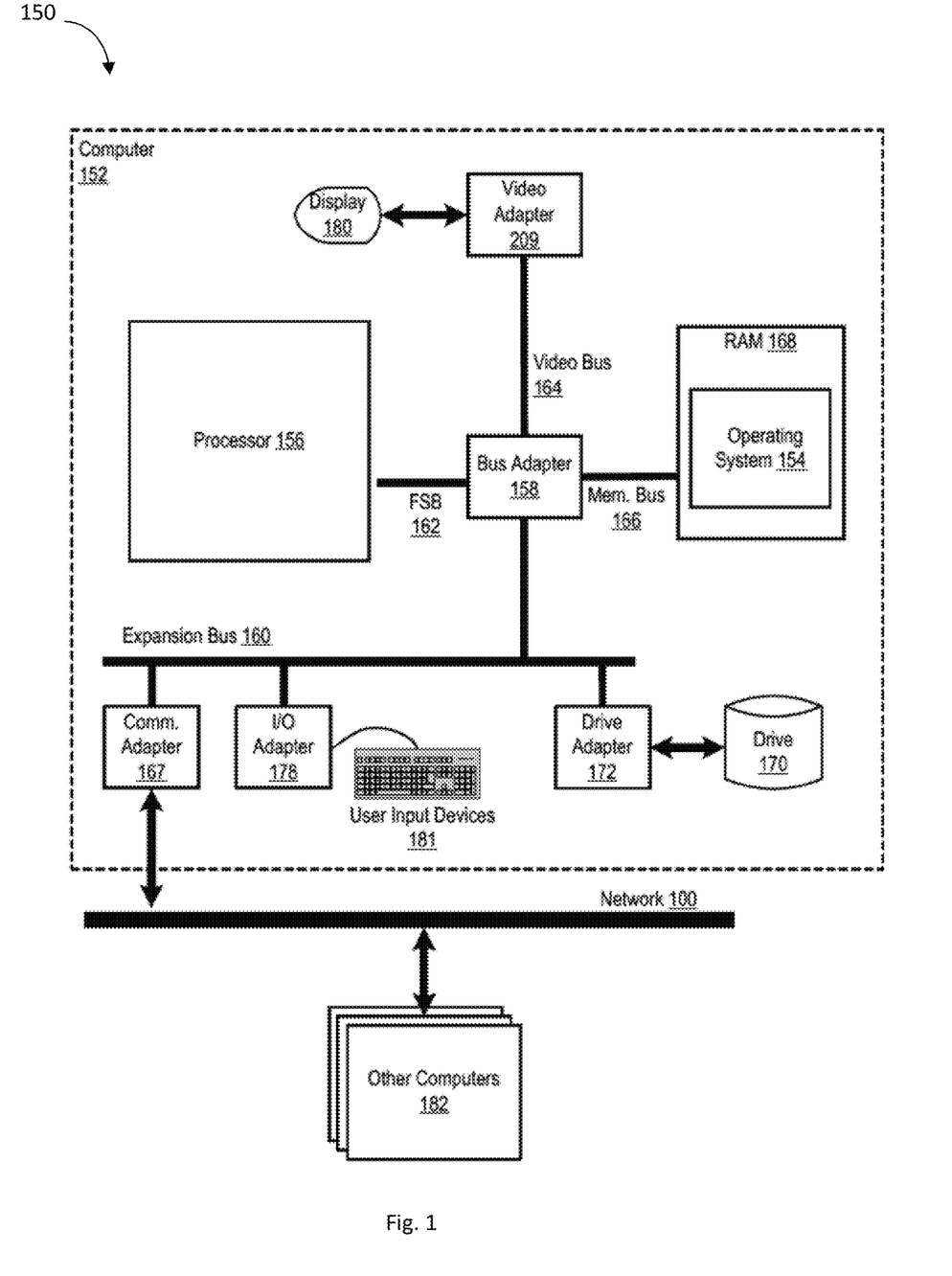
FIG. 1 is a functional block diagram illustrating a computer system, according to embodiments of the present disclosure.

Address translation and invalidation typically occurs in a data or information handling environment, and more specifically commonly in a processor based system and/or a computerized environment. FIG. 1 is a functional block diagram illustrating a computer system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components such as, for example, data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2A:
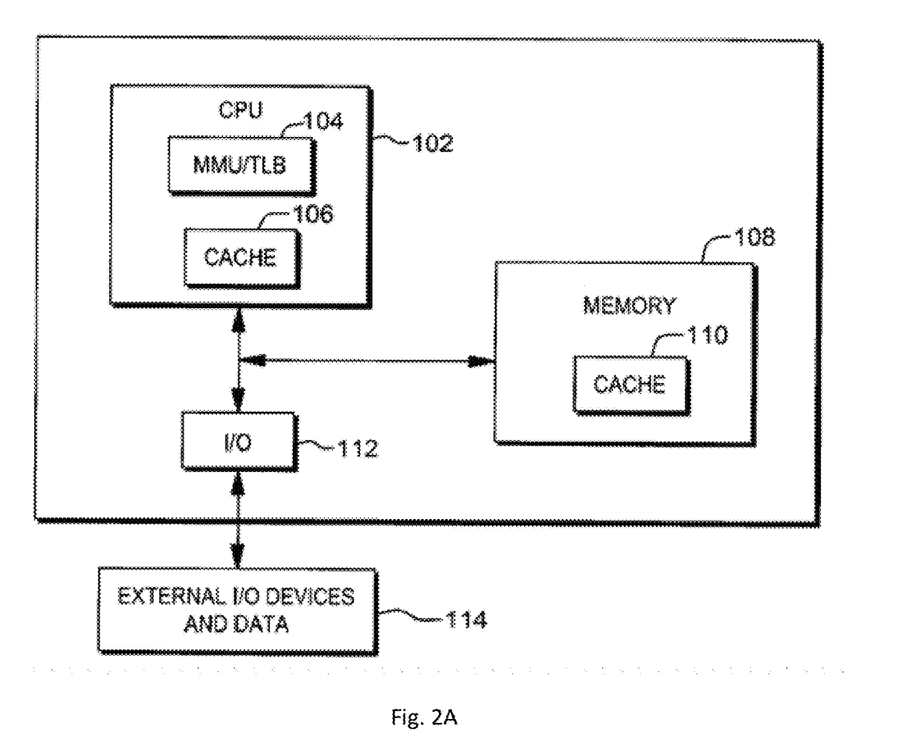
FIG. 2A depicts one example of a computing environment.

One example of a computing environment to incorporate and use one or more aspects of managing address translation including address translation capability and address invalidation is described with reference to FIG. 2A. In one example, a computing system 150 includes a processor (central processing unit—CPU) 102 that includes at least a cache 106 and at least one memory management unit (MMU) having a translation look-aside buffer (TLB), referred to as MMU/TLB portion 104. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit (MMU) 104 is used in managing memory portion 108 including facilitating access to the memory by providing address translation. In an embodiment, to improve address translation, the memory management unit (MMU) utilizes a translation look-aside buffer (TLB). The TLB is a cache of previously translated addresses. Thus, when a request is received for a memory access that includes an address to be translated, typically the TLB is checked first. If the address is cached in the TLB, then the address is provided to the processor. Otherwise, the received address is translated using one of any number of translation techniques, including a tablewalk process. Typically, when address translations need to be invalidated, the system quiesces into a single thread mode of operation, a TLB invalidate instruction (TLBie) in an embodiment is broadcast throughout the system, TLB caches are located, and each entry in the TLB is searched for matching entries. Matching page table entries (PTEs) in the TLB are invalidated. The computing system 150 of FIG. 2A can also utilize the methods and systems of managing address translations, including, in one or more embodiments, using in one or more aspects the address translation invalidation probe, as disclosed below.

Figure 2B:
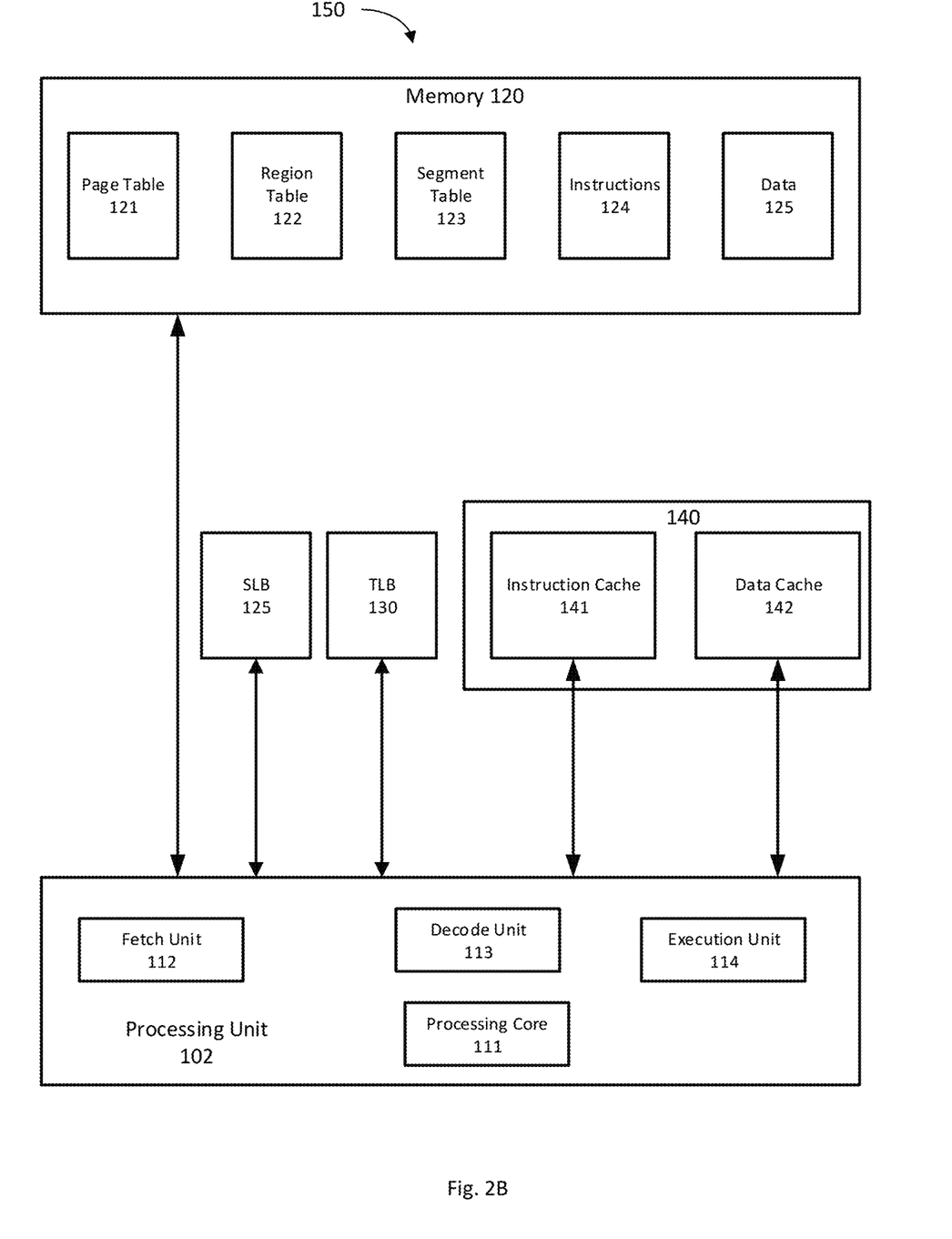
FIG. 2B depicts another example of a computing environment.

FIG. 2B illustrates a block diagram of an embodiment of a processing system 150 that represents one suitable environment within which address translation and address invalidation can be implemented. The processing system 150 includes a processing unit 102, memory 120, a segment look-aside buffer (SLB) 125, a translation look-aside buffer (TLB) 130, and cache memory 140. Cache memory 140 includes instruction cache 141 and the data cache 142, which store instructions and data, respectively, for quick access by the processing unit 102 during execution of instructions.

The processing unit 102 receives data, such as operand data, and instructions and executes the instructions. The processing unit 102 may include, for example, a processing core 111 including logic and other circuitry for processing data and instructions, a fetch unit 112 configured to fetch instructions, a decode unit 113 configured to decode instructions, and an execution unit 114 configured to execute the instructions. The execution unit may include a Load Store Unit (LSU). Although a few functional units of the processing unit 102 are illustrated for purposes of description, it is understood that the processing unit 102 may include additional functional units for retrieving, processing, and storing instructions and data.

The processing system 150 further includes main memory 120 configured to store tables, such as a page table 121, region table 122, and segment table 123, as well as instructions 124 and data 125 which may be accessed and manipulated by the instructions 124. The page table 121, region table 122, and segment table 123 are collectively described as dynamic address translation (DAT) structures 121, 122, and 123. The memory 120 may include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 120 may incorporate electronic, magnetic, optical, and/or other types of storage media. In some embodiments, the memory 120 may have a distributed architecture, where various components are situated remote from one another, but can be accessed by the processor processing unit 102. In this disclosure, the terms physical memory, real memory, and system memory are used interchangeably to refer to the main storage accessible to a processor.

Segment table 123 maps effective segment identifiers (ESIDs) to intermediate or virtual segment identifiers (VSIDs), on a segment-by-segment basis and has one or more segment table entries (STEs). Segment look-aside buffer (SLB) 125 stores one or more entries (STEs) from segment table 123. SLB 125 is a data structure used for caching some of the recently accessed segmented ID entries. The SLB entries are mappings between addresses in segment table 123 and addresses in multiple page table entries. Page table 121 maps intermediate or virtual addresses (VA) to real addresses (RA) on a page by page basis and includes one or more page table entries (PTEs). TLB 130 is a data structure used for storing some of the address mappings by caching page table entries (PTEs) from page table 121 in memory 120.

During operation, the CPU in an embodiment references a nested address that needs translating during processing of an instruction. Typically, the effective address is sent to the SLB 125 to provide a translation of the effective address to the virtual or intermediate address. When the EA is included as an entry in the SLB 125, then the virtual/intermediate address is sent to the TLB 130 to determine whether a corresponding entry exists in the TLB 130. When the virtual or intermediate address is included as an entry in the TLB 130, the real address (RA) is provided to the CPU, along with any additional information in the entry, such as data access information, page size, and the system proceeds using the corresponding physical memory address received from the TLB. If the address translation is not found in the SLB 125, the processing unit 102 may access the segment table 123 to obtain an effective-to-virtual (intermediate) address translation. If the virtual/intermediate-to-real address translation is not found in the TLB 130, the processing unit 102 may access the page table 121 to obtain a virtual/intermediate-to-real address translation.

Typically in the system of FIG. 2B when address translations need to be invalidated, a respective SLB invalidate instruction (SLBie) and/or TLB invalidate instruction (TLBie), in an embodiment, is broadcast throughout the system, the system quiesces into a single thread mode of operation, SLB and/or TLB caches are located, and each entry in the SLB and/or TLB are searched for matching entries. Matching segment table entries (STEs) and/or page table entries (PTEs) are invalidated. Searching the numerous SLB and/or TLB entries can take considerable time. The computing system 150 in FIG. 2B can also utilize the methods and systems of managing address translation, including, in one or more embodiments, using in one or more aspects the address translation invalidation probe, as disclosed below.

While FIG. 2B illustrates for purposes of description a processing system 150 including one processing unit 102, one SLB 125, one TLB 130, and one memory 120, embodiments of the present disclosure encompass any computing structure, including personal computers, servers, and mainframe computing structures including multiple CPUs.

Figure 2C:
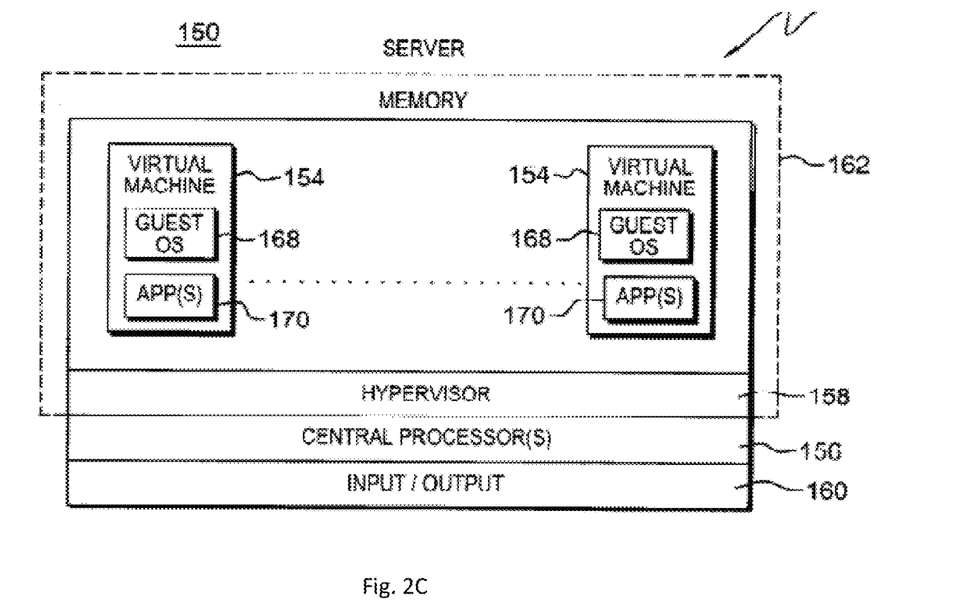
FIG. 2C is a functional block diagram illustrating a processing system within which address translation can be implemented.

An embodiment of a computing environment that can incorporate and use one or more aspects of the present invention is depicted in FIG. 2C. In this example, a computing system 150 includes a server 152 that includes, for instance, one or more virtual machines 154, one or more central processor(s) (e.g., central processing units) 156, at least one hypervisor 158, and an input/output subsystem 160. The virtual machines 154 and hypervisor 158 are included in memory 162.

In this embodiment, each virtual machine is capable of hosting a guest operating system 168 and may be executing one or more applications 170. An operating system or application running on a virtual machine 154 appears to have access to a full complete system, but in reality, only a portion of it is available. Central processor(s) 156 (e.g., central processing units) are physical processor resources that are assignable to a virtual machine 154. For instance, virtual machine 154 includes one or more logical processors, each of which represents all or a share of physical processor(s) 156 that may be dynamically allocated to the virtual machine. Virtual machines 154 are managed by hypervisor 158, such as PowerVM, offered by International Business Machines Corporation, as an example. Central processor(s) 156, like CPU 102, includes at least one MMU/TLB portion and at least one cache.

To perform address translation in the system of FIG. 2C, a first address translation between the virtual machine 154 and the hypervisor 158 is required. This first address translation between the virtual machine or guest operating system running on top of the hypervisor is referred to as a process-scoped translation. The process-scoped translation is from virtual environment to virtual environment. Every process scoped translation has a process ID (PID). The address used by the virtual or guest operating system is referred to as an effective address (EA), and it is translated to an intermediate virtual address (VA) used and recognized by the hypervisor 158. A second address translation is required between the virtual address (VA) used by hypervisor 158 and the real address (RA) in physical memory. This second address translation for the hypervisor between the hypervisor virtual environment and the real (physical) memory is referred to as a partition-scoped translation. The partition-scoped translation is between the intermediate virtual address (VA) and a physical or real address (RA). Every partition-scoped address translation has a logical partition ID (LPID). This partition-scoped address translation was discussed above in connection with FIG. 2B.

Invalidating a partition-scoped translation can cause delay as each entry in the TLB is snooped to find matching entries. Invalidating a process-scoped translation, e.g., a nested translation, can cause additional delay as each entry in both a first TLB and a second TLB need to be searched for matching entries. In addition, other data structures and the table walk process need to be managed to invalidate all the old translations. A system or process to better manage resources and operations when invalidating old or invalid address translation data structures would be advantageous.

In one or more embodiments, an invalidation probe could be introduced in the instruction pipeline of the memory management unit (MMU) to decrease the latency of invalidation operations, and eliminate the need for a multithreaded processor to operate in or quiesce into a single thread mode. In an embodiment, when the invalidation probe enters the MMU, the probe in an aspect causes all table walk machines (processes) that are walking an address translation relevant to the probe to be cancelled. Causing the table walks relevant to the invalidation probe to be cancelled is done via a compare process with the table walks that are executing. If there is an address compare match between the address(es) that are undergoing a table walk process and the address(es) within the scope of the invalidation probe, the table walks are cancelled. When these table walks are cancelled they will not be allowed to write to any address translation caching structure, e.g., no data translation structures, for example TLBs or SLBs, and will not return data.

Additionally, or alternatively, the probe will prevent the processor from using any address that hits in the address translation caching structures, e.g., TLBs or SLBs. To prevent the address translation caching structures from supplying address translations, the probe in an embodiment will sit in the MMU pipeline and match on any address translation that proceeds down the MMU pipeline. The probe will determine if there is any match on an address translation that is proceeding down the MMU pipeline by performing a comparison. If an address translation proceeding down the MMU pipeline matches on an address within the scope of the invalidation probe, then the probe in an embodiment ensures that the translation gets a miss on the address translation caching structure, e.g. the lookaside buffer, and is not allowed to start a tablewalk. Additionally, or alternatively, in an aspect, the probe could sit on the front of a caching structure and force misses when there is a matching address translation.

The probe is basically filtering anything that might match on the invalidation operation that caused the probe to be sent down the MMU pipeline. By not allowing any translation request to generate a real address (RA) based upon the invalidation operation that caused the probe, the MMU can allow other threads to perform their normal work. The MMU can allow all other threads to proceed with their instructions since the invalidation probe won't allow those other threads to do any work on any translation that is within the scope of the invalidation that caused the probe to be issued. By not allowing any request for translation to generate an address translation based upon the invalidation that caused the probe, the MMU can also effectively "finish" the invalidation early before the underlying invalidation operation has walked the entire address translation caching structure, e.g., lookaside buffer. The MMU can finish the operation early, before the entire lookaside buffer has been walked, since the invalidation operation will not allow any translation to hit on any of the entries in the address translation caching structure, e.g., the lookaside buffer, that are within the scope of the invalidation that caused the probe, even though the entry has not yet been invalidated in the lookaside buffers. The invalidation operation is "complete" from the perspective of the system (except for the MMU) because all other recipients of the MMU address translations will not be able to observe or use any of the address translations relating to the translation(s) being invalidated. In summary, the invalidation probe will allow invalidations to be "finished" as soon as the probe is fully installed into the pipeline and will allow other threads to proceed with normal operation.

Figure 3:
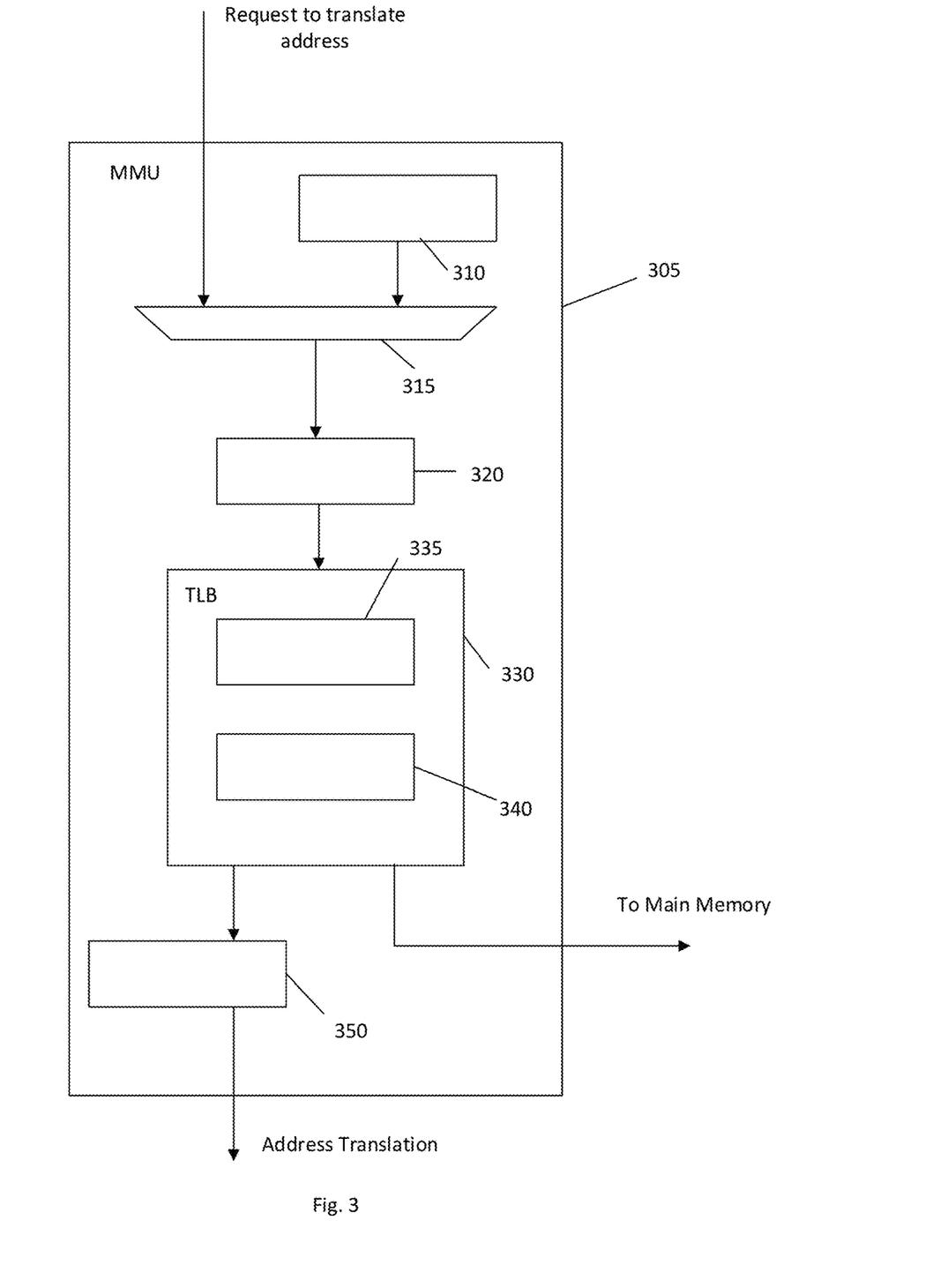
FIG. 3 is a functional block diagram of a Memory Management Unit (MMU) pipeline.

FIG. 3 illustrates a block diagram of an MMU 305 having a TLB 330 in which the address translation invalidation probe can be installed and operate to reduce latency associated with invalidating address translations. MMU 305 has invalidation control logic 310, an arbitrator 315 and an optional hash generator 320. The TLB 330 includes the TLB array 335 that contains the page table entries (PTEs). The MMU optionally could have an SLB that could sit in between the hash generator 320 and the TLB 330. In operation, and in response to a request to invalidate address translations, the invalidation probe 340 in an embodiment is installed into the MMU pipeline. If the MMU is processing a request to translate an address, and it hits in the TLB, the data from the PTE is sent to the TLB payload 350 for processing.

The invalidation probe 340 in one or more embodiments is installed in the MMU pipeline when an invalidation operation is issued to the Memory Management Unit 305. That is, in response to a request to invalidate an address translation, invalidation control logic 310, preferably residing in the MMU, requests a slot in the MMU pipeline for the address translation invalidation probe. The request to invalidate address translations (TLBie) is sent to arbiter 315. The arbiter 315 manages which requester gets the next available slot to insert a request/instruction into the pipeline. There are often multiple different requesters, e.g., the LSU, the invalidation control logic, XMQ (table walk machine), trying to get operations performed. The arbiter 315 is responsible for managing all these requests and allowing only one operation into the pipeline per cycle.

The scope of the address translation invalidation probe that will be installed into the pipeline is based in one or more aspects upon the type of invalidation that is creating the probe. The scope of the invalidation probe can range from a single virtual address to an entire process or partition. For example, if the invalidation is a partition-scoped invalidate, i.e., all translations with a given logical partition ID (LPID) should be invalidated, then the probe will also be partition-scoped. The scope of the invalidation probe determines how compares are performed both in the MMU pipeline as the invalidation probe compares on address translations proceeding down the pipeline, and in the table walks as the invalidation probe removes and/or cancels outstanding table walks. The scope of the invalidation probe is the same as the scope of the invalidation operation. Once the scope of invalidation operation is determined, the probe in an embodiment is sent down the MMU pipeline.

The data from the invalidation operation can be used to determine the scope of the invalidation probe, as the invalidation probe will have the same scope as the invalidation operation. The invalidation probe will have all relevant data to determine a match on the invalidation operation that caused the probe. The probe 340 will then be installed in the MMU 305. Once the probe is installed in the MMU, the probe will compare on all outstanding table walks. If the table walk is within the scope of the invalidation probe, the table walk will be marked to be cancelled. Marking or tagging the tablewalk to be cancelled, in one or more embodiments, ensures that when the tablewalk returns with data from memory, it will not be allowed to write the data into the lookaside buffers, and cannot be returned to the Load Store Unit (LSU) (or other caching structures) as a valid transaction. In addition, the tablewalk will not be allowed to continue its walk if it has not yet found a page table entry (PTE) in an address translation context that uses multi-level page table entries.

The compare that the probe performs on the table walk machine in an embodiment should be as broad as (or in an aspect broader than) the invalidation operation that caused the probe. For example, if the invalidation probe corresponds to an invalidation operation of a 1 gigabyte page, the probe should ensure that any smaller pages within that 1 gigabyte page are also invalidated. Therefore, if the probe sees a tablewalk for a 4 kilobyte page, the probe should only compare on bits down to the 1 gigabyte page boundary, and if that translation for that 4 kilobyte page hits on the 1 gigabyte boundary indicating that the 4 kilobyte page is within the 1 gigabyte page, the tablewalk should be marked to be canceled. In another case, if the invalidation is for a process with a process ID of 2, then the probe does not do a compare on any virtual address, and instead only looks at the process ID, e.g., for a process ID of 2, for all the outstanding table walks.

After the probe is installed, in one or more embodiments, it compares on every request for address translation that comes down the MMU pipeline. For example, while the probe is valid in the MMU pipeline, the process to invalidate the address translations is in one or more embodiments not finished and the processor is still operating and is processing requests for address translation. The compare operation performed by the invalidation probe on the address translations in the pipeline is, in an embodiment, the same as the comparisons performed on the table walks and is dependent upon the scope of the invalidation that caused the probe.

That is, the comparisons performed on the address translations in the MMU pipeline are the same scope as the comparisons performed on the table walks. The invalidation probe operates in an embodiment by looking at the address translation data after the address translation is looked up in the lookaside buffers. Accordingly, the lookaside buffers will be checked for matches on the address translation to be invalidated, and could get a hit and have a fully resolved address translation by the time the address translation invalidation probe performs its comparison. The address translation invalidation probe will do the comparison on the translation results from the lookaside buffer, and if the address translation is within the scope of the invalidation probe, the probe will override any hit from the lookaside buffer and reject the translation.

The address translation that the invalidation probe is comparing against may not hit in the lookaside buffer. Normally, when a comparison is performed to check if a translation is in the lookaside buffer, and the translation does not hit in the lookaside buffer, the MMU would initiate a table walk for the translation and attempt to generate the address translation. In one or more embodiments, when the invalidation probe does not hit in the lookaside buffer, the invalidation probe will do a compare before the tablewalk is allocated, and if the address going to main memory for translation (e.g., for a table walk) is within the scope of the invalidation probe, then the table walk will not be allowed to allocate, the operation will be rejected. In an embodiment, for example, where the LSU requests the translation, the MMU cannot perform the translation because the probe is blocking it (due to TLBie) so the MMU will reject the request and tell the requestor (LSU) to send it back at a later time. Hopefully the TLBie will be done at that later time when it comes back and there will be no probe installed to block the translation, thus allowing the valid translation to go back to the LSU.

Once the invalidation probe is installed, the MMU will not allow any translations to be solved that are within the scope of the probe. However, in one or more embodiments, there could exist address translations in the caches outside the MMU that are within the scope of the invalidation. Before the invalidation operation can be finished, the MMU in an aspect should ensure that no address translation can be generated from an address within the scope of the invalidation operation. In an embodiment, after the invalidation probe is installed in the MMU, the MMU will issue an invalidate to all lower level translation caches (LLC caches), e.g. L1, L2 and/or LLC caches. Once the lower level translation caches have invalidated all translations within the scope specified by the MMU, e.g., the Logical Partition Identifier (LPID), the Process Identifer (PID), the virtual address (VA), etc., the MMU can finish the invalidation operation.

In some processor implementations the translation caches may not need to be fully invalidated before the invalidation operation can be finished. The caches should ensure that no address translation can hit in the translation cache for the invalidation operation issued from the MMU before the invalidation operation can be finished. For example, the invalidation probe will allow invalidations to be "finished" once the probe has been fully installed in the MMU pipeline, and/or a signal has been received that the invalidation operations on the non-MMU caches has been completed, notwithstanding that the underlying invalidation instruction that triggered the invalidation probe has not completed its review (e.g., tablewalk) of all the address translation data structures.

Once the invalidation probe has been installed in the MMU, the invalidation probe will not allow any translation to hit in the lookaside buffers that are within the scope of the invalidation operation, however these translations may still be present and valid in the lookaside buffers. The MMU must continue the invalidation operation to invalidate the lookaside buffers and scrub all translations within the scope of the invalidation. Once all those invalidations have been scrubbed the probe can be deactivated. The MMU will be back to normal operations when the probe is deactivated.

Figure 4A:
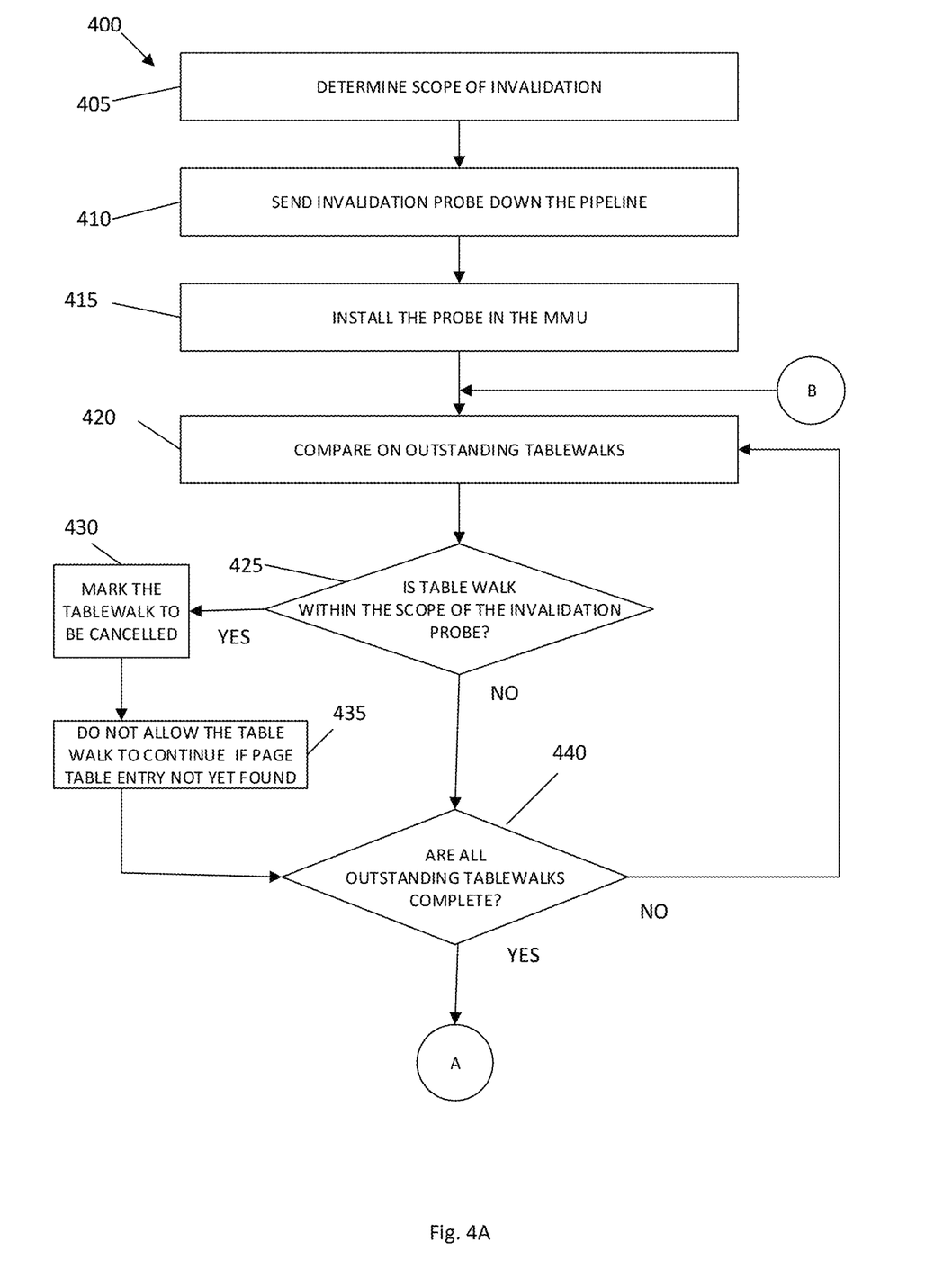
FIGS. 4A & 4B illustrate an exemplary flowchart illustrating and describing a method of invalidating address translations in an information handling system.
Figure 4B:
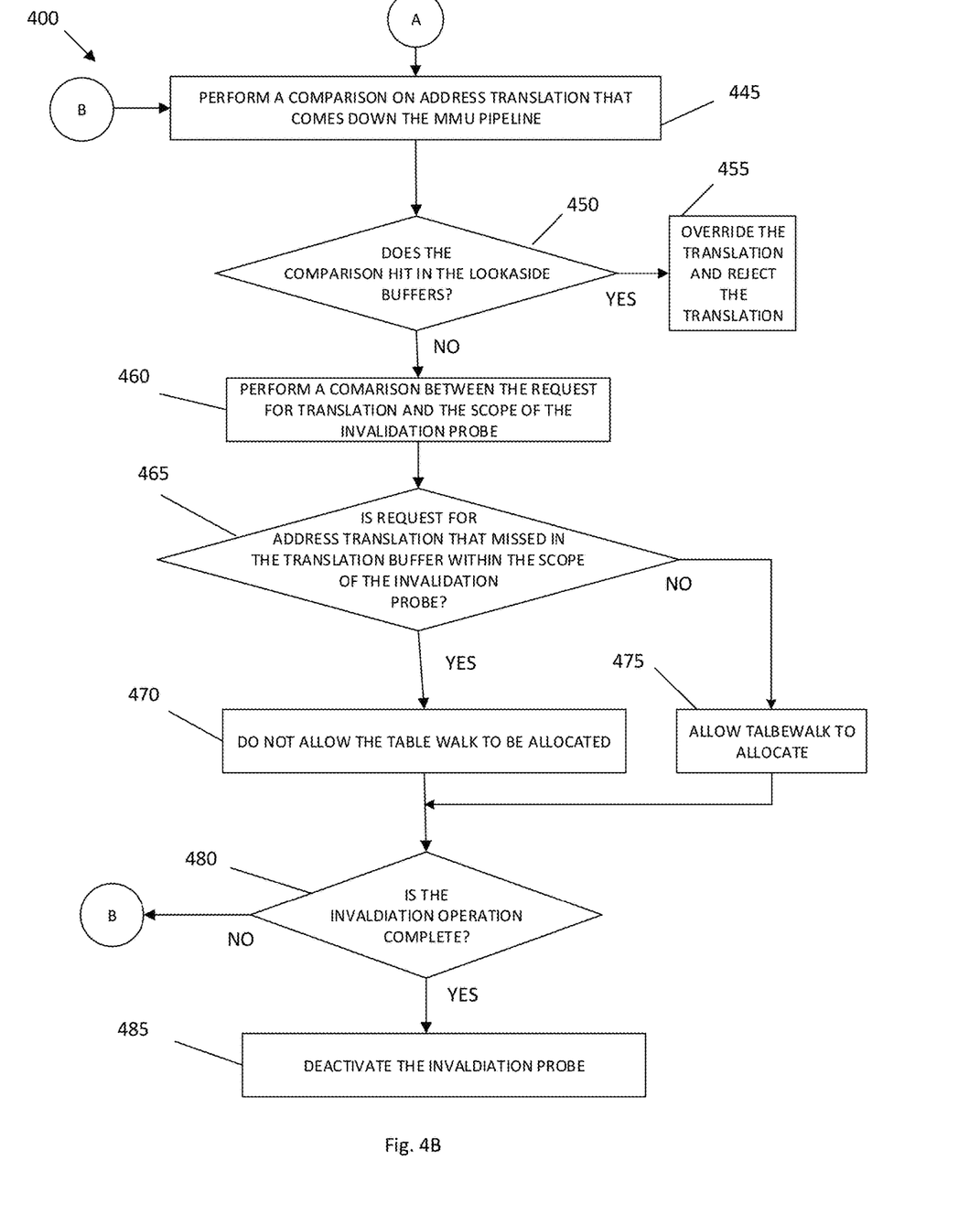

FIGS. 4A & 4B is an exemplary flowchart in accordance with one or more embodiments illustrating and describing a method 400 of managing address translation structures and processes, including a system and method of handling address translation invalidations. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 4A and 4B, but the process may be integrated and/or one or more steps may be performed together, simultaneously, or the steps may be performed in the order disclosed or in an alternate order.

At 405, the process 400, in response to a request to invalidate one or more address translations, determines the scope of the invalidation operation. Every address translation in an embodiment has a process or a logical partition identifier (PID and LPID), and when an invalidation is issued for that translation, the identifier can be used to determine the scope of the invalidation operation. For example, an invalidation operation is issued to the memory management unit (MMU), and if the invalidation (e.g., TLBie) is a partition-scoped invalidate, i.e., all translations within a given logical partition ID should be invalidated, then the scope of the invalidation is determined to be a partition-scoped invalidate operation. At 410, an invalidation probe is created and sent down the MMU pipeline. The scope of the invalidation probe is commensurate with the scope of the invalidation operation. The information to determine the scope of the invalidation probe can be obtained from the invalidation operation that triggers the invalidation probe. The probe is logic that performs a number of comparison operations and which enables logic to process and block, cancel, and/or respond to valid address translations in data translation structures that match on the scope of the invalidation. In an embodiment, the probe has all the relevant data to determine a match on the invalidation operation that caused the probe.

The probe at 415 is installed in the MMU pipeline. In one or more aspects, once the probe is installed the system can consider the invalidation operation complete, when often in fact the invalidation operation is ongoing in the background. In a first aspect, the probe will compare on all table walks that are being undertaken in the system at 420. At 425 it is determined whether the table walk is within the scope of the invalidation probe. In an aspect, the probe performs the comparison and determines whether the table walk is within the scope of the invalidation probe. If the table walk is within the scope of the invalidation probe (425: Yes), then at 430 the table walk is marked to be cancelled. That is, for example, when the table walk returns with data from memory, that data will not be written into the MMU lookaside buffers, and in an embodiment will not be returned to the load store unit (LSU) as a valid translation. At 435, in an address translation context that uses multi-level page table entries (PTEs), in an embodiment, the tablewalk process will not be allowed to continue its tablewalk if it has not yet found the PTE.

The process 400, after 435, or if the table walk being reviewed by the invalidation probe is determined at 425 to not be within the scope of the invalidation probe (425: No), continues to 440 where it is determined whether all outstanding tablewalks are complete. If not all the table walks are complete (440: No), then the process loops back to 425 where it is determined whether the table walk is within the scope of the probe. At 440, if all the tablewalks are complete, the process 400 continues to 445.

At 445, in a second aspect, the invalidation probe performs a comparison on address translations that come down the MMU pipeline. In an embodiment, at 450 it is determined whether the request for address translation in the lookaside buffer matches the scope of the invalidation probe. In an embodiment, the probe will look at the translation data after it is looked up in the lookaside buffers. The probe will perform a compare on the translation that is returned from the lookaside buffers, and if the translation returned from the lookaside buffers is within the scope of the of the probe (450: Yes), the probe at 455 will override any hit from the lookaside buffer and reject the translation. In an embodiment, when the MMU rejects the translation, it will instruct the requestor to send back the request at a later time. The request will continue to be rejected while the probe is installed, but at some point the TLBie will be done and no probe will be present to reject the request. If the request for translation that the invalidation probe is comparing against does not hit in the lookaside buffer (450: No), then the process continues to 460. For example, if the address returned from the lookaside buffer is not within the scope of the invalidation probe, then the process continues to 460. When the address misses in the lookaside buffer, the normal MMU operation would be to initiate a tablewalk for the translation and attempt to generate an address translation. In the process 400, the probe at 460 will perform a comparison with the address that will be used in the tablewalk (the address that missed in the lookaside buffer), before the tablewalk is allocated, and at 465 it is determined whether the request for address translation that missed in the lookaside buffer is within the scope of the invalidation probe.

If the request for address translation that missed in the translation buffer is within the scope of the invalidation probe (465: Yes), then at 470 the table walk is not allowed to allocate. If at 465, the request for address translation that missed in the translation buffer is not within the scope of the invalidation probe (465: No), then at 475 the tablewalk is allowed to allocate. At 480 it is determined whether the invalidation operation is complete. In this regard, once the probe is installed, the MMU will not permit any address translations to be resolved and updated in the data translation structures that are within the scope of the invalidation probe. There could exist, however, in one or more embodiments depending upon how extensive the invalidation probe is, address translations in caches outside the MMU that are within the scope of the invalidation operation. Before the invalidation operation can be finished, the MMU must ensure that no address translation can be generated from an address within the scope of the invalidation operation. Therefore, in one or more embodiments, the MMU will issue an invalidate to all lower level translation caches (LCCs), e.g, L1 and L2 caching structures. Once the lower level translation caches (LCCs) have invalidated all translation(s) within the scope specified by the MMU, the MMU can finish the invalidation operation. In one or more embodiments, the translation caches do not need to be fully invalidated before the invalidation operation can be finished. The caches in an embodiment need only ensure in an aspect that no address can hit in the translation cache for the invalidation issued from the MMU before the invalidation operation can finish. Once the MMU has finished installing the invalidate probe, the probe will not allow any translations to hit in the lookaside buffers that are within the scope of the invalidation, however, these translations may still be valid in the lookaside buffers. The MMU must continue to invalidate the lookaside buffers and scrub all translations within the scope of the invalidation operation. Once all the address translations have been scrubbed and the invalidation operation is complete (480: Yes), then at 485 the invalidation probe can be deactivated.

The probe in one or more embodiments, is just a set of compare logic that continuously looks at the operations flowing through the MMU pipeline. The probe is installed with a single operation, "Probe install", that flows down the pipeline with the relevant information to compare translations against operation marks the logic "active" which allows the probe to look at the pipeline and force rejects on TLB hits. The probe logic will continue to monitor the operations flowing down the pipe as long as it is marked "active". The probe is deactivated or marked "inactive" by another operation inserted by the Invalidation Control Logic, this operation is called "Probe Uninstall". This operation acts just like the "Probe Install" that activated the probe. Its sole purpose is to deactivate the compare logic so that it is so no longer allowed to force rejects on operations that match what the logic is comparing on. The probe logic is always there in the pipeline monitoring the operations, it's just a matter of if the logic is allowed to reject operations or not, which is determined by uninstalling/installing the probe.

If the invalidation operation is not complete (480: No), then the process 400 in an embodiment loops back to 445 as indicated by the connector B. In a further embodiment, if the invalidation operation is not complete (480: No), then the process 400 in an embodiment loops back to 420 as indicated by the connector B. And, in an embodiment, if the invalidation operation is not complete (480: No), then the process 400 in an embodiment loops back to 445 and 420 as indicated by the connector B. Not all the steps in process 400 described in connection with FIGS. 4A and 4B need to be employed in managing address translations, including the invalidation of address translation. For example, in one or more embodiments the process may only perform blocks 405-440 and 480-485, or only perform blocks 405-415 and 445-485. In an alternative embodiment, the process can have the loop 420-440 being processed while blocks 445-475 are being processed.

While the illustrative embodiments described above are preferably implemented in hardware, such as in units and circuitry of a processor, various aspects of the illustrative embodiments and/or techniques may be implemented in software as well. For example, it will be understood that each block of the flowchart illustrations in FIGS. 4A and 4B, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing addresses translations by a processing system comprising:
   in response to a request to invalidate one or more address translations, determining a scope of an address translation invalidation operation;
   installing an address translation invalidation probe in a memory management unit (MMU) pipeline;
   determining whether the address translation undergoing a table walk operation is within a scope of an address translation invalidation probe;
   in response to the address translation undergoing the table walk operation being within the scope of the address translation invalidation probe, preventing the table walk operation from writing data to a lookaside buffer in the MMU;
   performing, by the address translation probe, a comparison on an address translation returned by the lookaside buffer, and
   overriding, in response to the address translation returned by the lookaside buffer being within the scope of the address translation invalidation probe, the address translation returned by the lookaside buffer.

2. The method of claim 1, further comprising processing the address translation invalidation operation while the processing system determines whether the address translation undergoing the table walk operation is within the scope of the address translation invalidation probe.

3. The method of claim 1, wherein the scope of the address translation invalidation probe is commensurate in scope to the address translation invalidation operation.

4. The method of claim 1, further comprising, in response to the address translation undergoing the table walk operation being within the scope of the address translation invalidation probe, preventing the table walk operation from continuing.

5. The method of claim 1, further comprising:
   determining whether the address translation invalidation operation is complete; and
   in response to the invalidation operation being complete, deactivating the address translation invalidation probe.

6. The method of claim 1, further comprising the address translation invalidation probe performing an address translation comparison to determine whether an address translation request coming down the MMU pipeline is within the scope of the address translation invalidation probe.

7. The method of claim 1, further comprising, in response to the address translation returned by the lookaside buffer not being within the scope of the address translation invalidation probe, allowing an address translation process to proceed outside the MMU.

8. A method of managing addresses translations by a processing system comprising:
   in response to a request to invalidate one or more address translations, determining a scope of an address translation invalidation operation;
   using the scope of the address translation invalidation operation to determine a scope of an address translation invalidation probe;

installing the address translation invalidation probe in a memory management unit (MMU) pipeline;

performing an address translation comparison to determine whether an address translation returned by a lookaside buffer in the MMU pipeline is within the scope of the address translation invalidation probe; and in response to the address translation returned by the lookaside buffer being within the scope of the address translation invalidation probe, preventing the address translation returned by the lookaside buffer from being used.

9. The method of claim 8, further comprising, in response to the address translation results returned by the lookaside buffer not being within the scope of the address translation invalidation probe, allowing a translation process to proceed outside the MMU.

10. The method of claim 8, further comprising:
determining whether an address translation undergoing a table walk operation is within the scope of the address translation invalidation probe; and
in response to the address translation undergoing the table walk operation being within the scope of the address translation invalidation probe, preventing the table walk operation from writing data to the lookaside buffers.

11. The method of claim 8, wherein the scope of the address translation invalidation probe is same as the scope of the address translation invalidation operation.

12. The method of claim 8, further comprising processing the address translation invalidation operation while the processing system determines whether an address translation undergoing a table walk operation is within the scope of the address translation invalidation probe.

13. The method of claim 8, wherein, in response to an address translation undergoing a table walk operation being within the scope of the address translation invalidation probe, preventing the table walk operation from continuing.

14. The method of claim 8, further comprising:
determining whether the address translation invalidation operation is complete; and
in response to the address translation invalidation operation being complete, deactivating the address translation invalidation probe.

15. The method of claim 14, further comprising invalidating address translations in lower level caches outside the MMU wherein the address translation invalidation operation is not complete until the address translations in the lower caches are scrubbed.

16. A computing system comprising:
a processor comprising:
a memory management unit (MMU) for managing address translations;
an address translation lookaside buffer having a plurality of entries;
and a non-transitory computer-readable storage medium comprising program instructions that when executed by the processor cause the system to:
in response to a request to invalidate one or more of the address translations, determine a scope of an address translation invalidation operation;
use a scope of the address translation invalidation operation to determine the scope of an address translation invalidation probe;
install the address translation invalidation probe in a memory management unit (MMU) pipeline;
perform an address translation comparison to determine whether an address translation request coming down the MMU pipeline is within the scope of the address translation invalidation probe;
in response to an address translation returned by the address translation lookaside buffer being within the scope of the address translation invalidation probe, do not use the address translation returned by the address translation lookaside buffer;
and in response to the address translation returned by the address translation lookaside buffer not being within the scope of the address translation invalidation probe, allow a translation process to proceed outside the MMU to obtain an address translation.

17. The system of claim 16, further comprising program instructions that when executed by the processor cause the processor to:
determine whether an address translation undergoing a table walk operation is within the scope of the address translation invalidation probe;
and in response to the address translation undergoing the table walk operation being within the scope of the address translation invalidation probe, prevent the table walk operation from writing data to the address translation lookaside buffer.

18. The system of claim 16, further comprising program instructions that when executed by the processor cause the processor to, in response to an address translation undergoing a table walk operation being within the scope of the address translation invalidation probe, preventing the table walk operation from continuing.

19. The system of claim 16, further comprising program instructions that when executed by the processor cause the processor to:
determine whether the address translation invalidation operation is complete; and
in response to the address translation invalidation operation being complete, deactivate the address translation invalidation probe.

* * * * *